United States Patent
Doran

(10) Patent No.: US 6,466,324 B1
(45) Date of Patent: Oct. 15, 2002

(54) SERVO GUIDED STAGE SYSTEM WITH YAW SENSOR

(75) Inventor: Samuel K. Doran, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 09/608,535

(22) Filed: Jun. 30, 2000

(51) Int. Cl.[7] .............................................. G01B 11/02
(52) U.S. Cl. ......................... 356/500; 356/73; 356/138
(58) Field of Search .............................. 356/138, 139.1, 356/154, 150, 53, 500, 498, 493, 486, 487, 509, 490, 72, 73

(56) References Cited

U.S. PATENT DOCUMENTS 5,140,242 A * 8/1992 Doran et al. ................ 318/640

\* cited by examiner

Primary Examiner—Samuel A. Turner
Assistant Examiner—Patrick Connolly
(74) Attorney, Agent, or Firm—Ira Blecker; Cantor Colburn LLP

(57) ABSTRACT

A positioning stage has a base which carries a stage plate slidably on its upper surface. Three rotatable drives engage both the stage plate and the base to move the stage plate on the base to provide motion along the x and y axes plus rotation. The linear drives each include a motor and a capstan driven by the motor and a drivebar frictionally coupled to the capstan. The stage is spring loaded to provide constant down-load force, regardless of the varying extension length of the drivebar. A ball joint permits varying between the cones and the ball of the ball joint dynamically to desired levels. Pitch, roll, and movement in the Z-axis are precisely maintained by the stage plate. X and Y position are determined by an X interferometer and a Y interferometer, respectively. Yaw is measured by a yaw sensor device for determining yaw angle comprising a light emitting source and a position sensing detector, which generates an analog signal that is the input to a yaw servo to correct yaw error.

10 Claims, 9 Drawing Sheets

SERVO GUIDED STAGE SYSTEM WITH YAW SENSOR

BACKGROUND OF THE INVENTION

1. Field of the Invention

This invention is directed to a drive mechanism for accurately positioning a work stage along two axes with three degrees of freedom.

2. Related Art

Mechanisms for positioning a work stage for locating a work piece are well known in the art. For example, U.S. Pat. No. 4,528,490 of Hansen for "Two Axis Drive for Stage" includes a base plate and an additional pair of stacked plates, one known as a stage plate and the other as an intermediate plate. Each plate is driven by a drive. The intermediate plate is driven by drive bar along a linear direction with respect to the base plate. A drive means for the stage plate includes a motor driven capstan, and a drive bar has angular freedom of movement, i.e. is pivotally mounted under stage plate. The stage plate is thus free to move along a second path and to rotate.

J. Reed et al "High Speed Precision X-Y Stage", J. Vac. Sci. Technol. B, Vol. 3, No. 1 pp. 112 et seq., (Jan./Feb. 1985) describe conventional linear ways and ball bearings but "incorporates a unique capstan/swinging drive bar design to couple the servomotors and the X and Y stage elements." The stage comprises three stacked plates coupled to one another by crossed linear bearings. The bottom plate is affixed to a base. The center plate is fixed rigidly to its drive bar through a preloaded duplex bearing. The drive bars are driven by a servomotor via a friction-drive capstan.

S. Ido et al. "Precision X-Y Stage for Electron Beam Lithography System" pp 267–268 Bull. Japan Soc. of Prec. Eng. Vol. 18, No. 3 (September 1984) describe a stacked X-Y stage configuration with hydrostatic bearings.

Kallmayer et al "X-Y Table" IBM Technical Disclosure Bulletin Vol. 30, No. 7 (December 1987), pp. 376–377 show three rigidly mounted spindle drives with stators affixed to a rigid support so they do not pivot relative to the table 4, and so the flexibility of the drives is limited by their rigid mounting to a restricted range of motions afforded by the guides and in the slots in the table 4. In addition, two of the spindle drives are parallel to each other. Laser interferometers and mirrors are used to measure displacement.

Tsuyuzaki et al. J. Vac. Sci. Technol. B, Vol. 4, No. 1 p28X, (January/February 1986) describe a plate structure or "planar" stage with X-Y motion accuracy imparted via machined guide slots in the base and a substrate positioning table. An X-Y cross structure is placed within these slots between the top table and the base. A low friction polymeric material such as PTFE is employed as a bearing surface.

Constant Download Friction Drive System, IBM Technical Disclosure Bulletin, Vol. 32, No. 8A, (January 1990) pages 120–121 describes a method and apparatus for canceling the variation in download exerted by the end of a drivebar system by preloading the drivebar as shown in FIG. 3 herein.

Ball Joint Pivot with Dynamic Preload

DISCUSSION OF RELATED ART

Ball type pivot joints provide multiple degrees of freedom about a point at the center of a ball of spherical shape. Heretofore, ball joints have included two basic types including as follows:

(1) Spring-loaded joints and
(2) Spherical bearings.

Spring-loaded ball joints include a pair of cones or sockets which are tightened against the ball to eliminate backlash. A disadvantage of that system is that when using high preloads for high linear stiffness, there is considerable friction and wear between the ball and the cones or sockets.

The spherical bearing ball joint relies on closely matched inner and outer spherical bearing elements. This type of ball joint has high linear stiffness and low friction, but by the nature of this design must operate with a small clearance between the inner and outer bearings. Such a small clearance increases with wear and the backlash associated with this clearance makes it unsuitable for micropositioning applications.

U.S. Pat. No. 5,140,242 to Doran et al., which is herein incorporated by reference in its entirety, discloses a servo guided stage system having integrated dual axis plane mirror interferometers for sensing stage position. U.S. Pat. No. 5,052,844 to Kendall, which is herein incorporated by reference in its entirety, discloses a ball joint with an adjustable preload for use in a stage positioning system.

Conventional methods for positioning a substrate, however, use costly or ineffective means to measure the yaw angle of the stage. What is needed in the art is a stage position system having simplified yaw angle measuring device.

BRIEF SUMMARY OF THE INVENTION

Now, according to the present invention, the above-described and other disadvantages of the prior art are overcome or alleviated by the positioning stage comprising a base having rectilinearly disposed x and y axes, a stage plate slideably supported on said base, at least three linear drive means rotatably engaging both said stage plate and rotatably engaging said base for moving said stage plate on a path with at least three separate drive displacements along said rectilinearly disposed x and y axes and rotation of said plate on said base substantially parallel to the surface of said base, said plate moving upon the surface of said base, whereby combined x, y rectilinear and rotary motions with respect to said base can be achieved, an x interferometer and receiver for determining x position, a y interferometer and receiver for determining y position, and, a yaw sensor device for determining yaw angle comprising a light emitting source, a cylinder lens, and a position sensing detector. In this manner, the x position measurement, the y position measurement, and the yaw measurement can be used to close mechanical servo loops to accurately position the stage plate and eliminate yaw errors.

A method for determining yaw angle of a positioning stage also is provided comprising directing an incident beam of light from a light emitting source at a reflective surface on said positioning stage to create a reflected beam of light, passing said reflected beam of light through a cylinder lens to vertically focus said reflected beam of light on a position sensing detector, and generating a signal from said position sensing detector, wherein said signal is dependent upon the lateral position of said reflected beam on said position sensing detector.

The above-described and other features and advantages of the present invention will be appreciated and understood by those skilled in the art from the following detailed description, drawings, and appended claims.

BRIEF DESCRIPTION OF THE DRAWINGS

The present invention will now be described by way of example only, with reference to the accompanying drawings, which are meant to be exemplary, not limiting, and wherein like elements are numbered alike in several FIGURES, in which:

FIG. 10 also shows rotation of the stage plate about an angle Theta.

FIG. 11 shows a partially sectional view of a ball joint linkage with an automatically controlled actuator for preloading the ball joint.

FIG. 12 is a modification of the ball joint linkage of FIG. 11.

FIG. 13 is another embodiment of the ball joint linkage analogous to FIG. 12 but the structure for applying force to the cones and the ball in the joint is modified.

DETAILED DESCRIPTION OF THE INVENTION

Described herein is a simplified system for measuring and controlling the X-Y stage plate of a stage positioning system. Specifically, two interferometers are used to detect X and Y position, while a position sensing detector is used to determine the yaw angle of the stage.

Figure 1:
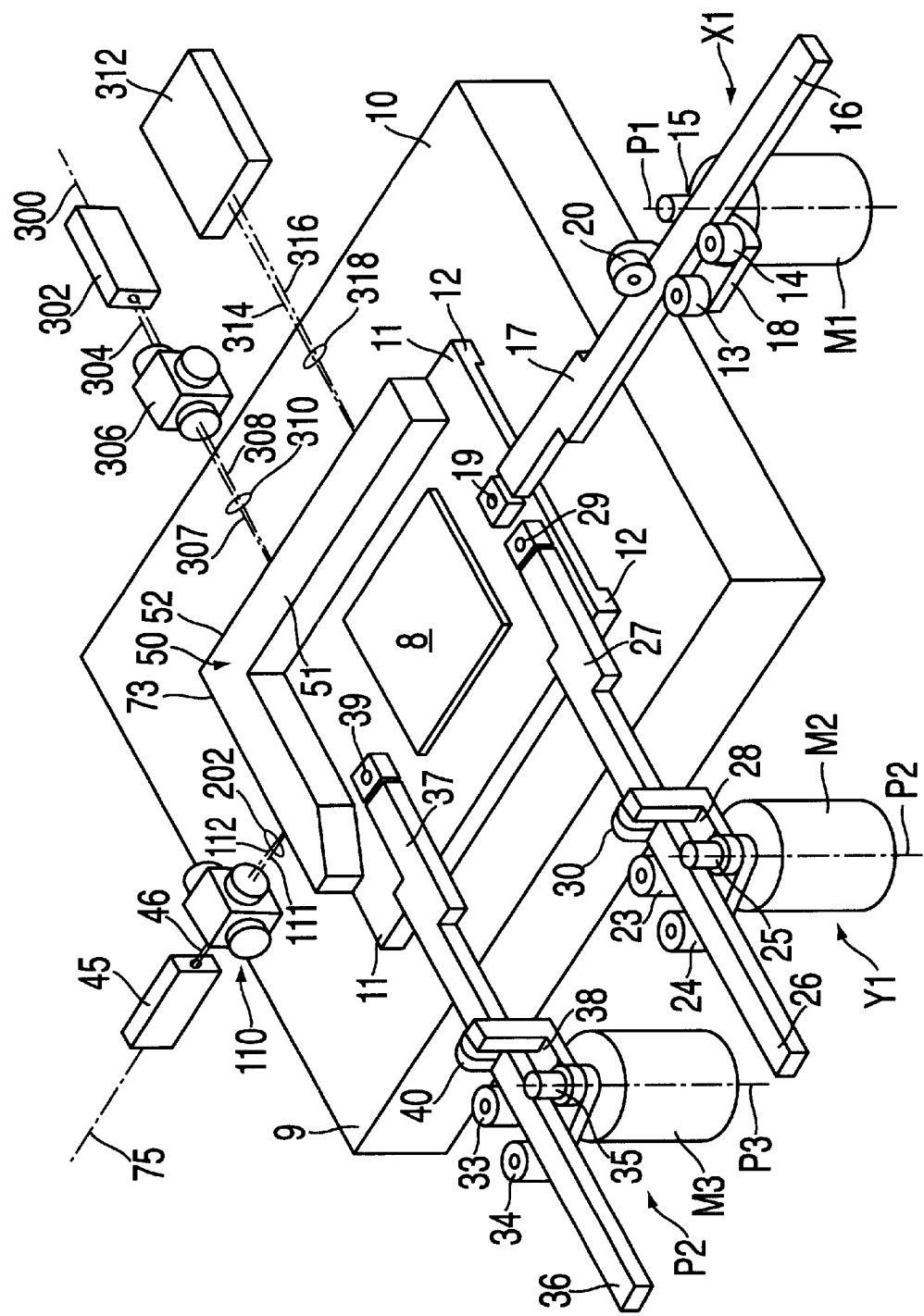
FIG. 1 is a perspective view of an x, y, theta stage plate and a plurality of linear drives including drivebars driven by friction drive units and a control system for positioning the stage plate.

Referring to FIG. 1, a base 10 supports a stage plate 11, adapted for carrying a work piece 8 slideably supported for moving on the upper surface of the base 10. The plate moves along the rectilinear x and y axes which rest substantially parallel with the flat surface of base 10. Base 10 is preferably a very flat, massive stable table comprising a material such as granite, ceramic or steel with a highly polished, extremely flat planar upper surface 9 which carries the X-Y stage plate 11, with plate 11 supporting on its upper surface a work piece 8. The lower surface of stage plate 11 is slideably supported on the upper surface 9 of base 10 by low friction supports such as feet 12 composed of a low friction polymeric material such as PTFE (polytetrafluoroethylene) or, alternatively, the feet 12 can be replaced by equivalent support bearings such as air bearings or roller bearings.

To the X-Y stage plate 11 there are pivotably secured three linear, friction drive units X1, Y1 and Y2. The drive unit X1 includes a drive motor M1 which is located along one side of base 10 and the Y1 and Y2 include drive motors M2 and M3 which are located along the adjacent side of base 10 spaced well apart from each other to provide three degrees of freedom to the stage plate 11. The transmission of power for drive unit X1 on one side of the X1-drivebar 16 (comprising ceramic or steel material) is provided by two pinch rollers 13 and 14 and a capstan 15 driven by motor M1. The X1 drive capstan 15 is located on the opposite side of X1-drivebar 16 from pinch rollers 13 and 14 so that a friction drive is provided by the capstan 15 and the two rollers 13 and 14. Preload roller 20 presses down on the top of X1-drivebar 16. Pinch rollers 13 and 14 as well as drive capstan 15 and roller 20 are mounted on carriage 18 to rotate about pivot P1 along the axis of the shaft of the motor of drive unit X1 to permit pivoting of drivebar 16. The rollers 13 and 14 on one side, and the capstan 15 on the other side exert opposing forces which act together to provide friction drive engagement of the capstan 15 with drivebar 16 for reciprocating it longitudinally as capstan 15 turns while concomitantly permitting the drivebar 16 and the carriage 18 carried on the shaft of capstan 15 and rollers 13 and 14 to pivot about the axis P1 of the shaft of the capstan 15, thereby permitting rotation of the drivebar 16 on carriage 18 and the shaft of capstan 15. Drivebar 16 is offset at its inner end 17 where it connects to a linkage including pin 19 secured to stage plate 11 to secure the drivebar 16 to stage plate 11.

The X and Y position of the stage plate 11 is measured by a laser interferometer system with a pair of bars 50 and 51 secured to two orthogonal sides of plate 11 opposite from the drive units X1, Y1 and Y2. Each of bars 50 and 51 has a mirrored surface 73 and 52 respectively for measuring the X-axis and Y-axis displacements of stage plate 11. Laser beam 75 passes through interferometer 110, which produces beams 111 and 112. Together, beams 111 and 112 are grouped as reference 202 for clarity. Beams 111 and 112 are reflected from mirror 73 to interferometer 110, which produces an output beam 46 directed at receiver 45.

Laser beam 300 is provided to interferometer 306, which produces beams 307 and 308. Together, beams 307 and 308 are grouped as reference 310 for clarity. Beams 307 and 308 emanate from interferometer 306 towards mirror 52, and are reflected back from mirror 52 to interferometer 306. Interferometer 306 then produces output beam 304, which passes to receiver 302 from the interferometer 306.

Receiver 302 and receiver 45 are optical-to-electrical transducers for converting the laser signal to electronic signals. The receivers 302 and 45 include a lens which focuses the laser beam onto an active chip of a silicon photodiode. Each receiver 302, 45 (which can be a commercially available product such as the Hewlett Packard 10780A receiver) includes a photodetector, an amplifier and level translator, a line driver, a level sensor (comparator) and local voltage regulators. The receivers 302 and 45 convert the Doppler-shifted laser light into electrical signals that can be processed by the electronic system to determine the X and Y positions of the mirror.

Theta Angle Measurement Apparatus

The θ angle, or "yaw" angle, of the stage plate 11 is determined by directing an incident light beam 314 from a light source in a yaw sensor 312 against mirror 52 at a slightly downward vertical angle, α, (which is not the yaw angle) relative to the plane of the stage plate 11. A reflected beam 316 is directed back into yaw sensor 312, where it strikes a position sensing detector. Together, beams 314 and 316 are grouped as reference 318 for clarity. Based upon the yaw angle of the stage 11, the position sensing detector generates an analog signal, which is sent to the control electronics. The yaw sensor 312, light source, position sensing detector, and yaw angle are discussed in more detail below within the discussion of FIGS. 15 through 18.

Constant Download Friction Drive System

Figure 2:
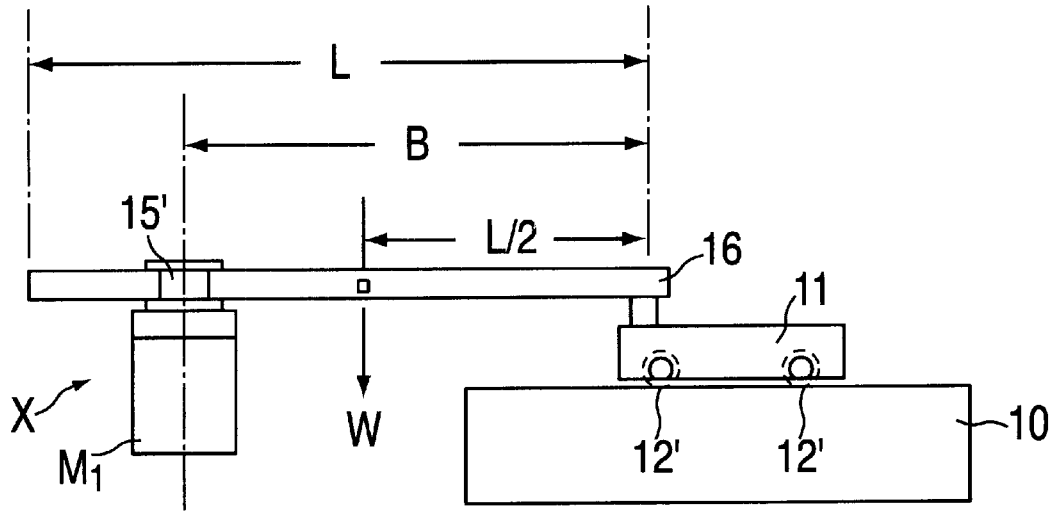
FIG. 2 shows an example of a prior art drivebar system.
Figure 3:
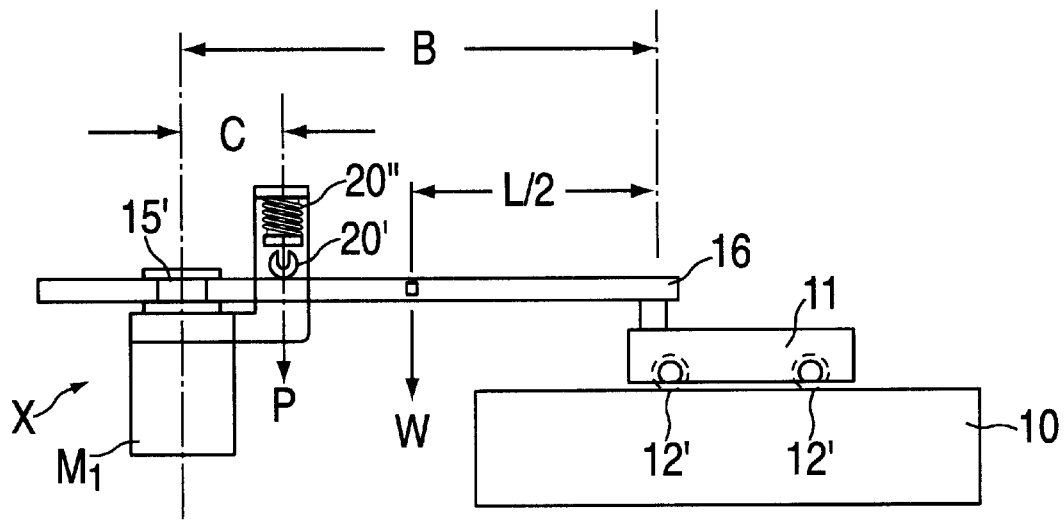
FIG. 3 shows a preload roller which has been added to the drivebar system of FIG. 2.

FIGS. 2 and 3 illustrate how the variation in download exerted by the ends of drivebars 16, 26 and 36 is minimized.

Friction drive units are frequently used in mechanical systems for highly precise positioning of components such as work pieces and the like. A problem with such systems is that the download of the drivebar upon the driven component varies with the cantilevered extension of the drivebar along its path.

FIG. 2 shows an example of a prior art drivebar system. If a drivebar 16 of length L and weight W is extended by a distance B beyond where it is supported by a friction drive unit X with a capstan 15' contacting drivebar 16 at the drive point, it will exert a force of W(B-L/2)/B on the driven object: stage plate 11. The stage plate 11 is shown supported on rollers 12' in this modified embodiment. It is assumed that the center of gravity of the drivebar 16 is at L/2, but this is not necessary. The variation of the download force causes a variation in the strain or distorting of the driven object. If the object is driven off center, a varying pitching moment is also applied to the load. It should be noted that a download force at the end of the drivebar 16 is not necessarily a disadvantage because it can be used as a preload. It is the variation in the download force as a function of the extension of the drivebar 16 which causes the problem.

FIG. 3 shows a preload roller 20' which is added to the drivebar system of FIG. 2. The preload-roller 20' under the force of a spring 20" exerts a force P preloading the drivebar 16 at a distance C from the drive point and exerts a force PC/B on the driven object. (While a spring 20" is preferably employed as shown in FIG. 3, in the embodiment of FIG. 1 the spring has been omitted from FIG. 1, for convenience of illustration.) If the product PC equals WL/2, then the download force at the distal end of drivebar 16 where it connects to the driven object: stage plate 11 does not change materially as the drivebar 16 extends and retracts. The product PC is a torque exerted about the drive point. Means other than a preload-roller 20' can be used to create this torque.

Figure 4:
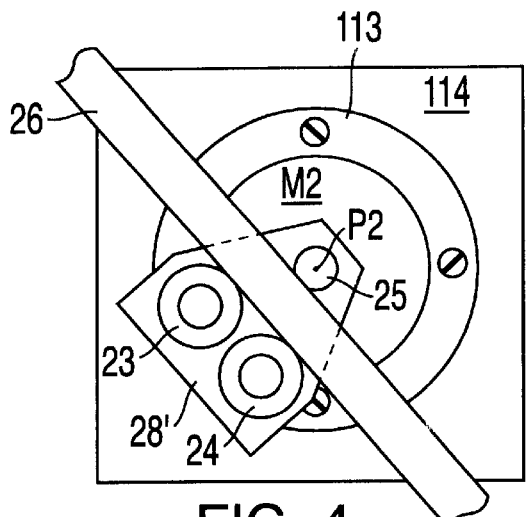
FIG. 4 shows a detailed plan view of a capstan and pinch rollers for driving a drivebar in a first diagonal position.
Figure 5:
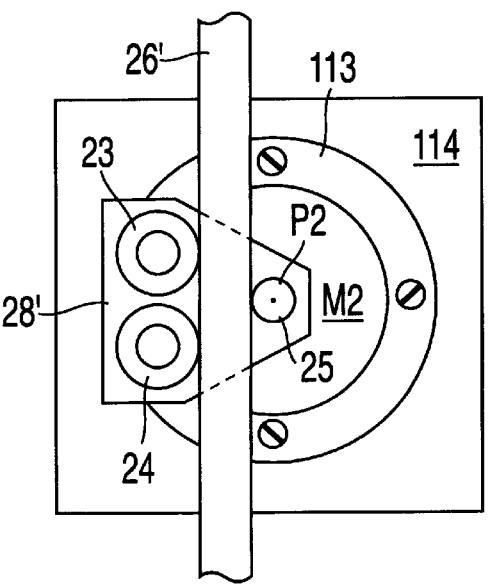
FIG. 5 is a variation of FIG. 4 in which the drivebar is shown in a vertical position after rotation of the capstan and pinch rollers about the axis of the capstan.
Figure 6:
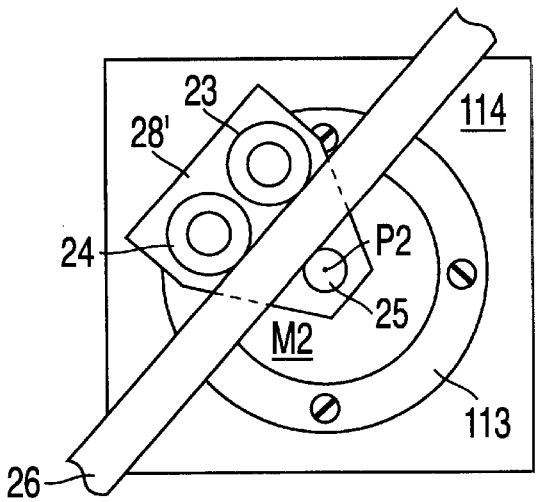
FIG. 6 is a further variation of the drive of FIG. 5 where the drivebar has been rotated to the opposite diagonal position.
Figure 7:
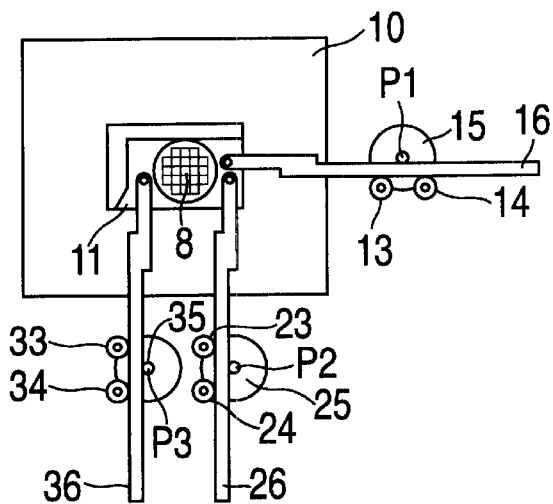
FIGS. 7–10 show plan views of the stage of FIG. 1 which have been simplified for the purpose of illustrating the way in which drivebars in accordance with this invention can be driven linearly to locate the stage plate anywhere on the base supporting it.

FIGS. 4, 5 and 6 are simplified illustrations of the rotatable carriages 28' (similar to carriages 18, 28 and 38 in FIG. 1) carrying elements of a friction drive adapted to produce linear motion of one of the drivebars 16, 26, and 36 showing one of the rotatable drive capstans 15, 25 and 35. In this case capstan 25, which is turned by motor M2, is holding the drivebar 26 between the side of capstan 25 and the sides of pinch rollers 23 and 24. The capstan 25 is supported on a shaft (not shown) which has a bearing within carriage 28' which has been modified in that the preload roller 30 has been omitted for ease of illustration. Carriage 28' rotates about the shaft carrying capstan 25 so that the drivebar 26 can rotate from the position in FIG. 4 where it is rotated from a diagonal orientation to a vertical position in FIG. 5 to a reverse diagonal position in FIG. 6. It should be noted that for the X1-drivebar 16, FIG. 4 is analogous to FIG. 9, FIG. 5 is analogous to FIG. 7 and FIG. 6 is analogous to FIG. 8.

X, Y, Theta, Three-Linear-Drivebar System

X1-drivebar 16 reciprocates in general in parallel with the X axis as indicated in FIG. 1, with rotation about P1 axis away from parallel with the x axis to afford enhanced flexibility of being able to provide positioning of pin 19 and stage plate 11 anywhere within predetermined boundaries of base 10. As can be seen in FIGS. 7–10, the plate 11 can be rotated through an angle theta (as shown in FIG. 10) with respect to the X and Y axes using the three drive assemblies of FIG. 1 in cooperation, where the displacement of drivebars 26 and 36 is unequal.

FIGS. 7–10 show plan views of the stage of FIG. 1 which have been simplified for the purpose of illustrating the way in which drivebars 16, 26 and 36 in accordance with this invention can be driven linearly to locate the stage plate 11 anywhere on the base 9 supporting it.

Figure 8:
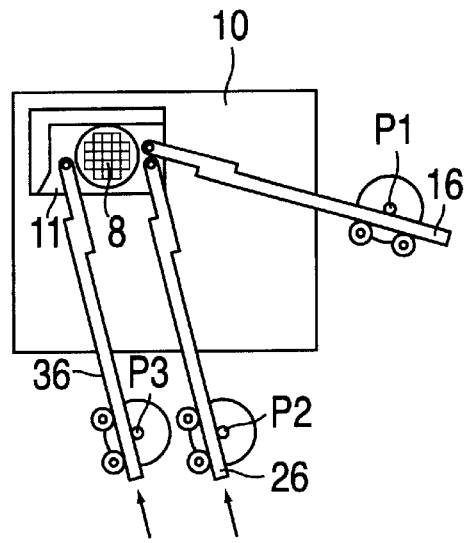
Figure 9:
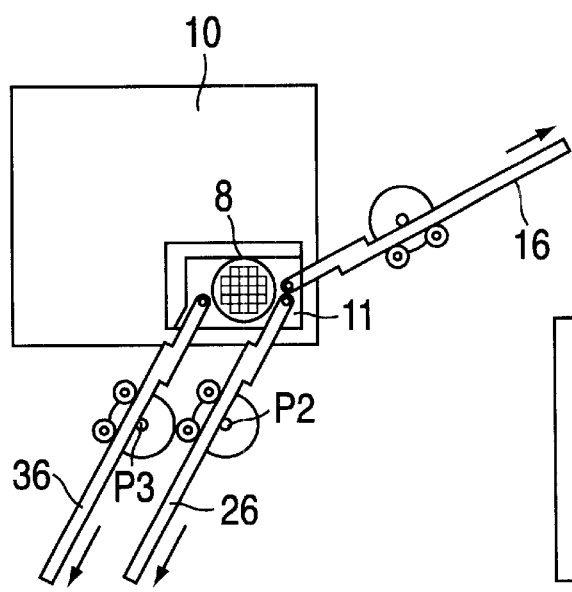
Figure 10:
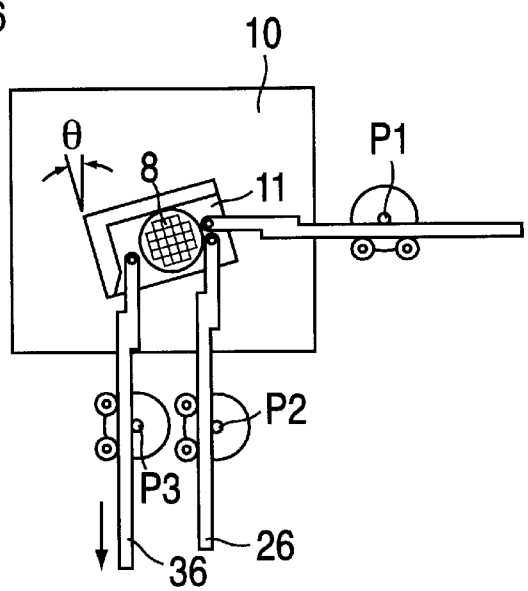

FIGS. 7–9 illustrate the capacity of the drive to position the stage plate 11 in the four remote positions on the base 10. FIG. 10 shows rotation of the stage plate 11 about an angle Theta.

FIGS. 7–10 show plan views of the table of FIG. 1 which have been simplified for the purpose of illustrating the way in which the three drivebars 16, 26 and 36 can be driven linearly to locate the stage plate 11 anywhere on the base 10. The work piece 8 shown represents a wafer with chips indicated by squares on the work piece 8. Rotation through angle Theta is shown by FIG. 10.

In FIG. 7, all the drivebars 16, 26 and 36 are approximately half way extended with the X1-drivebar 16 horizontally oriented, parallel to the X axis, and the Y-drivebars 26 and 36 vertically oriented parallel to the Y axis.

FIGS. 8 and 9 illustrate movement of plate 11 and work piece 8 to two opposite corners of the base 10, and it is obvious that the other two corners can be reached by analogous operation of the drivebars. To move the plate 11 to the left, the X1-drivebar 16 is driven to the left. To move plate 11 to the right, X1 drivebar 16 is driven to the right. In each case, the drivebars 26 and 36 will pivot about the pivots P2 and P3.

In FIG. 8, drive unit X1 and drivebar 16 has been driven to the left, and drivebars 26 and 36 have been rotated counter-clockwise. All three drivebars 16, 26 and 36 have been extended to their fullest extension to move the stage plate 11 to its illustrated position—i.e., furthest from the three drive units X1, Y1, and Y2.

In addition, to move the plate 11 to the upper left, drivebar 16 is driven to the left and drivebars 26 and 36 are driven upwardly, with the drivebar 16 rotating clockwise about axis P1, and drivebars 26 and 36 rotating counter-clockwise about pivots P2 and P3, as shown in FIG. 8.

To move the plate 11 to the lower right of the base 10 as shown in FIG. 9, the drivebars 26 and 36 are retracted downwardly to near their lowest excursion with the drivebar 16 rotated counter-clockwise from its positions in FIGS. 7 and 8, and with drivebars 26 and 36 rotated to their clockwise extreme positions. To move to the lower left of base 10, the drivebars 26 and 36 will be rotated to their counter-clockwise extremes as the drivebar 16 is moved to the left along the X-axis, rotating slightly clockwise to move the plate 11 to its proximal position.

In FIG. 9, drive unit X1 and drivebar 16 have been rotated counter-clockwise. Drive units Y1 and Y2 as well as drivebars 26 and 36 have been rotated clockwise. All three drivebars 16, 26 and 36 have been retracted to their shortest extension to move the stage plate 11 to its proximal position, i.e. nearest to the three drive units X1, Y1, and Y2.

In FIG. 10 the rotation from the position in FIG. 7 has been achieved by driving the second Y-axis drive 36 downwardly while holding the first Y-axis drivebar 26 and the X1-axis drivebar 26 stationary.

Pinch rollers 23 and 24 cooperate with capstan 25 to provide friction drive engagement with drivebar 26 which is secured at inner end 27 to pin 29 which connects the drivebar 26 to stage plate 11. Pinch rollers 23 and 24 as well as drive capstan 25 and roller 30 are mounted on carriage 28 to rotate about pivot P2 along the axis of the shaft of the motor M2 of drive unit Y2.

Pinch rollers 33, 34 cooperate respectively with capstan 35 to engage with drivebar 36 which is secured at inner end 37 to pin 39 which connects the drive unit Y2 to stage plate 11. Pinch rollers 33 and 34 as well as drive capstan 35 and roller 40 are mounted on carriage 38 to rotate about pivot P3 along the axis of the shaft of the motor of drive unit Y1.

Ball Joint Pivot with Dynamic Preload

A ball-type pivot joint in accordance with this invention employs dynamic preload adjustment of the ball joint. The ball joint includes a ball and a pair of cones which are dynamically preloaded by servo (feedback) control of a preload actuator. Alternate designs are limited by manufacturing and assembly tolerances as well as wear of bearing surfaces or are subject to change due to thermal fluctuations.

Ball type pivot joints provide multiple degrees of freedom about a point at the center of a ball of spherical shape. Heretofore, ball joints have included two basic types including spring loaded joints and spherical bearings.

Spring loaded ball joints include a pair of cones or sockets in which the springs press the cones or sockets against the ball to eliminate backlash. A disadvantage of that system is that when using high preloads for high linear stiffness, there is considerable friction and wear between the ball and the cones or sockets.

The spherical bearing ball joint relies on closely matched inner and outer spherical bearing elements. This type of ball joint has high linear stiffness and low friction, but by the nature of its design must operate with a small clearance between the inner and outer bearings. Such a small clearance increases with wear and the backlash associated with this clearance makes it unsuitable for micropositioning applications.

The joint in accordance with a preferred embodiment of this invention provides the ability to alter the preload between the cones and the ball dynamically to desired levels. This is a very significant advantage for use in micropositioning applications such as an X-Y stepper stage. When the stage or other device is in motion, the preload can be reduced to provide low friction and wear. When the stage or other device is not in motion, then the preload can be increased to provide zero backlash and high stiffness.

Figure 11:
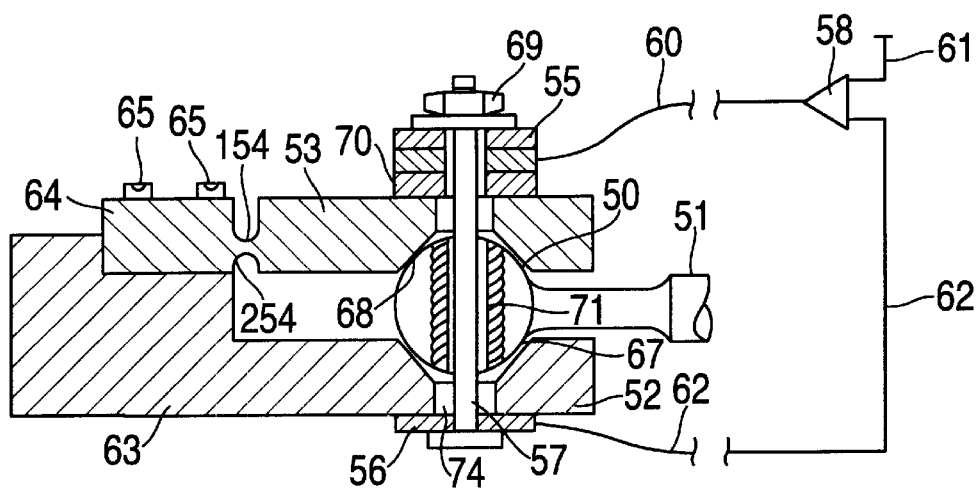
FIGS. 11, 12 and 13 show three alternative arrangements for a ball joint in accordance with this invention with conical bearings therefor for use in the linkage between one of the drivebars and the stage plate.
Figure 12:
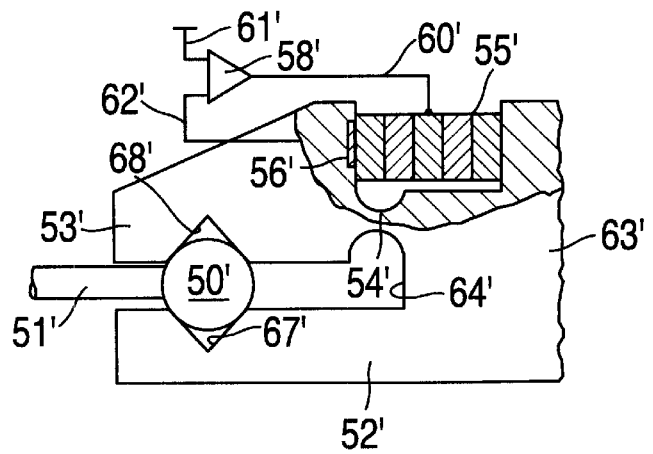
Figure 13:
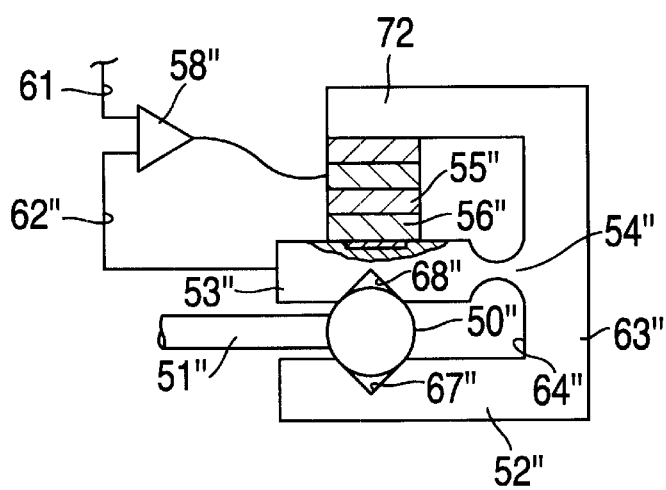

This is achieved using the arrangement depicted in FIGS. 11–13. Referring to FIG. 11, a drive rod 51 (having a round cross section at the end) with a ball end 50 is located between two cones or sockets 67 and 68 in a fixed member 52 and a preload bar 53, respectively. The cone 67, shown in the preferred embodiment in FIG. 11 as a fixed cone 67, is affixed to an object to be moved. The preload cone 68 is formed in the lower surface of preload bar 53. Preload bar 53 is connected to flange 64, i.e. pivot end 64. The opposite ends of bar 53 are the flange 64 secured to base 63 and the main body 53 which are flexibly connected together by flexure strip 54 formed between the elongated pair of transverse slots 154 and 254. In summary, flexure strip 54 provides from an elevational point of view a flexure "point" formed between body 53 and flange 64 which forms the pivot end 64 of the preload bar 53.

Flange 64 is affixed to base 63 of fixed member 52 by threaded fasteners 65. Base 63 is a mounting plate having holes therethrough for fastening to the stage plate 11 by threaded fasteners (not shown.) The flexure pivot 54 permits preload cone 68 in member 53 to be moved through a small angle about the flexure pivot 54. Preload actuator 55 is mounted so as to provide a compressive preload force acting to press down against the preload member 53 and preload cone 68. Preload actuator 55 comprises a piezoelectric or equivalent actuator such as a pneumatic, hydraulic, voice coil actuator, or the equivalent.

The compressive preload force applied to the cones 67 and 68 and to the ball 50 by using a preload tensioning rod 57 and a preload tensioning nut 59 through a hole in the center of preload actuator 55. In addition rod 57 passes through a hole 70 in preload member 53 through the center of the preload cone 68, through ball 50 and through the fixed member 52 and the center of fixed cone 67 as well as a hole 74 in the center of a preload sensor 56 comprising a strain gauge or the equivalent such as a force gauge.

Load sensor 56 is mounted so as to detect the load on the tensioning rod 57. Line 62 connects the strain drive electronics 58 whose output is connected to the input of the piezoelectric preload actuator 55. To increase the preload force upon the ball joint, the actuator 55 is extended or increases in thickness to compress the ball joint. To reduce the preload force, the actuator is retracted or made thinner, with the servo 58 having a predetermined level programmed into it electronically. The preload force can be altered at a frequency limited only by the bandwidth of the actuator 55. Servo 58 has another input 61 from a system controller for the purpose of setting the desired level of preload.

Although FIG. 11 shows a system using a tensioning rod 57 and a closed-loop servo system, other arrangements can be employed to provide dynamic preload adjustment forces on a ball-type pivot joint.

FIG. 12 shows a modified embodiment of this aspect of the invention where a drive rod 51' with a ball end 50' is located between two cones or sockets 67' and 68' in fixed member 52' and wedge-shaped preload lever 53'. Those two cones are shown in FIG. 12 as a fixed cone 67' formed in the upper surface of fixed member 52', which are affixed to the object to be moved and a preload cone 68'.

The preload cone 68' is an integral part of wedge-shaped lever 53' connected integrally through a flexure pivot 54' to pivot end 64' which is integral with base 63' eliminating the need for a separate preload bar secured to the base 63'. The flexure pivot 54' permits preload cone 68' in lever 53' to be moved through a small angle about the flexure pivot 54'.

Preload actuator 55' is mounted so as to provide a preload force acting to press laterally against the preload lever 53' which drives preload cone 68' down against ball end 50'. The compressive preload is achieved without using a preload tensioning rod and nut 59 since wedge-shaped lever 53' is integral with fixed member 52'. Preload sensor 56' is mounted so as to detect the load on the wedge-shaped lever 53' from actuator 55'. Line 62' connects the electrical output from strain gauge 56' into the input of the preload servo and drive electronics 58' whose electrical output signal is connected to the input of the piezoelectric preload actuator 55'.

To increase the preload force upon the ball joint, the actuator 55' is extended or increases in thickness and to reduce the preload force, the actuator is retracted or made thinner, with the servo 58' having a predetermined level programmed into it electronically. The preload force can be altered at a frequency limited only by the bandwidth of the actuator 55'. Servo 58' has another input 61' from a system controller for the purpose of setting the desired level of preload.

FIG. 13 shows another embodiment analogous to FIG. 12 where like elements have like functions, but the structure for applying force to the cones and the ball is modified.

In this embodiment drive rod 51" has a tall end 50" located between two cones or sockets 67" and 68" in fixed member 52" and preload lever 53", respectively. Fixed cone 67" is formed in the upper surface of fixed member 52" which is affixed to the object to be moved. Preload cone 68" is formed in the lower surface of preload bar 53" connected integrally through a flexure pivot 54" to pivot end 64" which is integral with base 63' eliminating the need for a separate preload bar secured to the base 63". The flexure pivot 54" permits preload cone 68" in member 53" to be moved through a small angle about the flexure pivot 54".

Preload actuator 55" is mounted so as to provide a compressive preload force acting to press down against the preload member 53" and preload cone 68". The compressive preload is achieved using a preload tensioning arm 72 integral with base 63". Preload sensor 56" is mounted so as to detect the load on the bar 53" from actuator 55".

Line 62" connects the electrical output from strain gauge 56" into the input of the preload servo and drive electronics 58" whose electrical output signal is connected to the input of the piezoelectric preload actuator 55". To increase the preload force upon the bearing, the actuator 55" is extended or increases in thickness and to reduce the preload force, the actuator is retracted or made thinner, with the servo 58" having a predetermined level programmed into it electronically. The preload force can be altered at a frequency limited only by the bandwidth of the actuator 55". Servo 58" has another input 61" from a system controller for the purpose of setting the desired level of preload.

Figure 14:
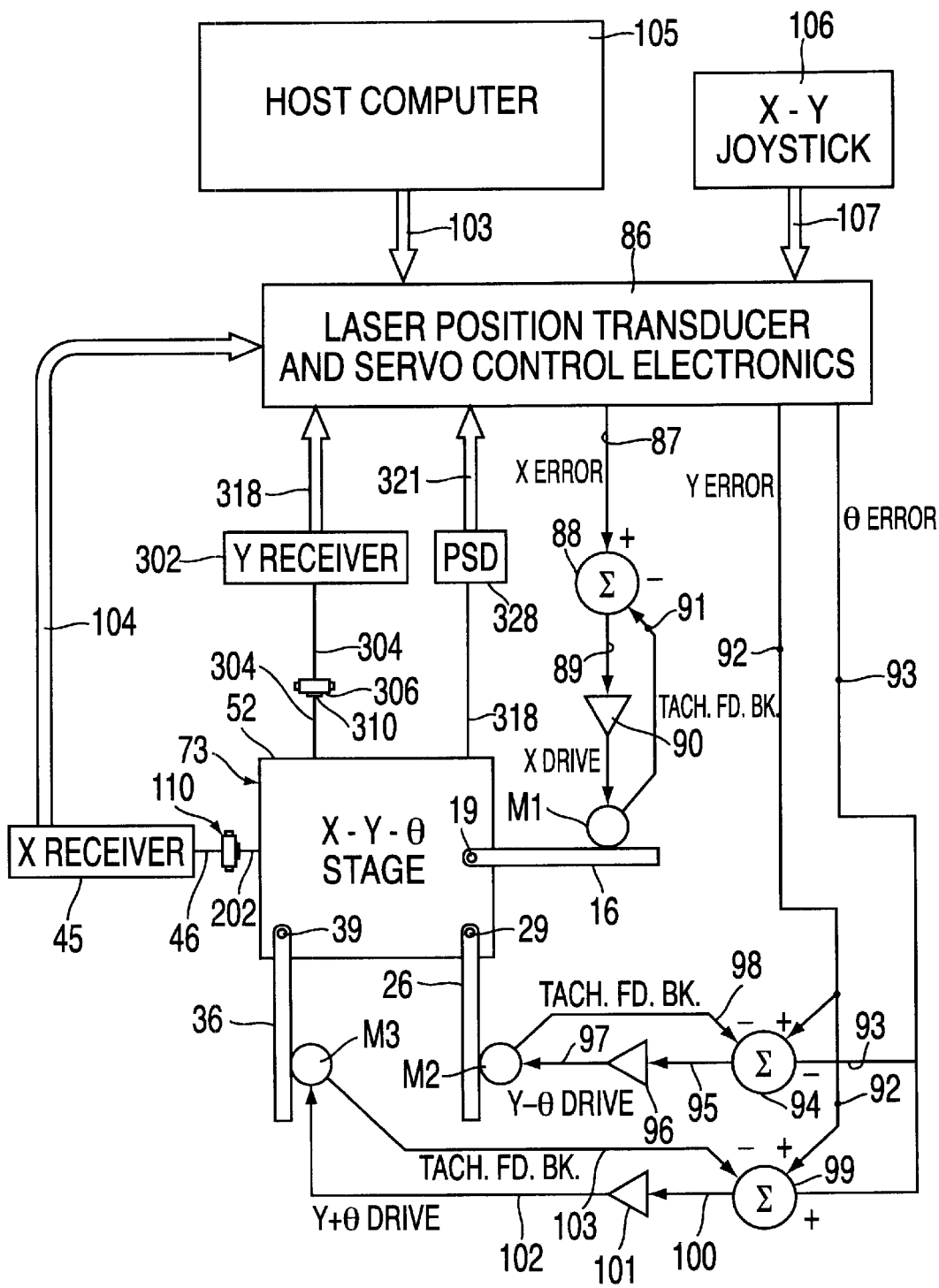
FIG. 14 shows the electrical schematic diagram of the control system for the drives employed to position the stage of FIG. 1.

FIG. 14 shows the electrical schematic diagram of the control system for the stage 11. Three identical velocity servos shown in FIG. 2 are used to move the three capstan drive units M1, M2, and M3.

When the servo control electronics 86 receives a new destination from a host computer 105 on lines 103, a series of velocity values are sent to the velocity servos of FIG. 14 to cause the stage 11 to move to the desired new destination. The closed loop position servo loop gain vs frequency and the maximum values of stage velocity, acceleration, and rate of change of acceleration are controlled by stored parameters and software in the servo control electronics 86.

The velocity servos can be operated with the position servo loop opened during gaging and initialization operations when the laser beams are not activated. Also, the analog joy stick can be used for manual stage control with the Theta servo holding the Theta of the stage near zero.

Fine actuators such as piezoelectric transducers can be added to each of the three drivebars 16, 26 and 36 when higher positional and angular accuracy is required (less than 1 micrometer and 10 microradians.) This provides a coarse and a fine servo combination where the fine servo can have a higher gain bandwidth because it is driving only the mass of the stage and the payload. The mass of the drivebar and the inertia of the motors M1, M2 and M3 are outside of the fine position servo loop.

An X-Y joystick 107 also provides input to the control electronics 86 for manual control of the position of the x-y-theta stage 11.

The Laser Position Transducer and Servo Control electronics 86 receives the X position signals from the output of the X axis receiver 45 through cable 104. Control electronics 86 also receives the output of the Y axis receiver 302 through cable 318. Control electronics 86 also receives the output of the position sensing detector 328, through cable 321.

The electronics 86 have X1-error output 87 to the positive input of summing circuit 88 which provides an output to X-1 drive amplifier 90 which energizes motor M1 which is shown in FIG. 1. The tachometer feedback 91 is shown on line 91 which connects to the negative input of summing circuit 88 to provide negative feedback.

The electronics 86 also have a Y Error output 92 to the positive input of summing circuit 99 and summing circuit 94. Summing circuit 99 provides an output 100 to Y+Theta drive amplifier 101 which energizes motor M3 which is shown in FIG. 1. The tachometer feedback on line 103 is connected to the negative input of summing circuit 99 to provide negative feedback.

The electronics 86 further have a Theta-error output 93 to the negative input of summing circuit 94 and the positive input of summing circuit 99. Summing circuit 94 provides an output 95 to Y-theta drive amplifier 96 which energizes motor M2 which is shown in FIG. 1. The tachometer feedback 98 is shown on line 98 which connects to the negative input of summing circuit 94 to provide negative feedback.

When pure X motion is desired the host computer loads a new X destination. A series of X velocity commands are given to move the X motor M1 and drive bar 16 until the stage position error is driven to zero at the new X location. While the stage is moving in the X axis, the Y position servo is driving the Y Motors M2 and M3 to actively keep the Y position error near zero. Also during the X move, Theta disturbances will occur so the Theta servo actively drives the Y motors M2 and M3 differentially to keep the YAW near zero during the move and to hold it near zero after the move.

The Theta servo maintains the Theta (yaw angle) of the stage near zero by electronically superimposing small velocity corrections 93 to the Y velocity commands 92 in summing junctions 94 and 99. The dedicated closed loop Theta servo is constantly compensating for tiny gain differences in amplifiers 96 and 101 and motors M2 and M3, inertia differences in the stage and drive bars 26 and 36 and dynamic friction differences in the bearing pads. The Theta servo also removes the Theta disturbances caused by the X drive bar 16. Since the task of maintaining a small value of Theta is accomplished by a dedicated Theta servo, the Y position servo hardware and software can be identical to the X position servo.

If a Theta value other than zero is desired, the host computer can load a Theta value into the electronics and the Y drive bars 26 and 36 will be pushed and pulled with motors M2 and M3 as required to achieve the new Theta value.

Pure Y motion can be achieved by loading a new Y destination and maintaining the same X position.

Figure 15:
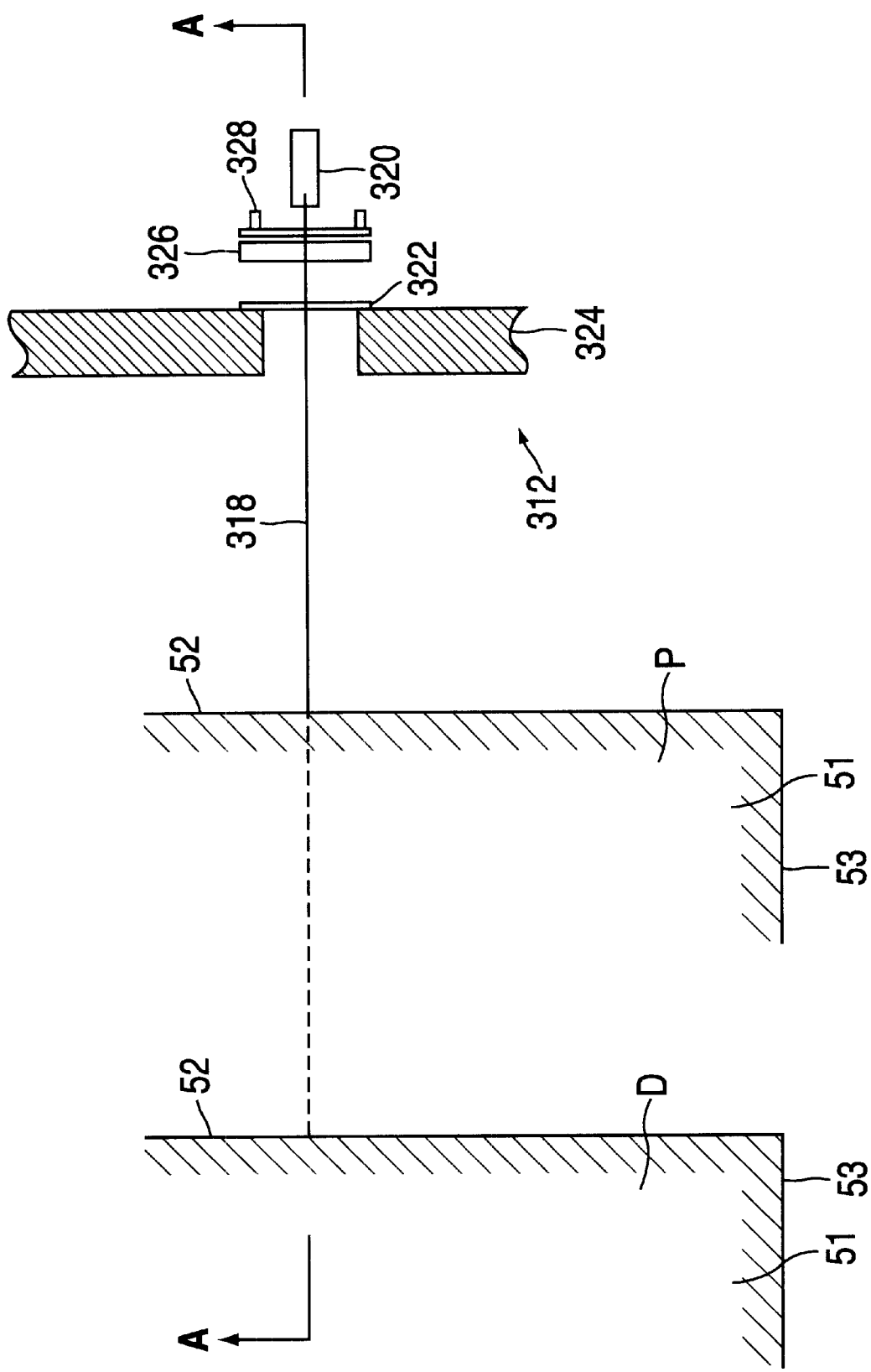
FIG. 15 is a plan view of the yaw sensor comprising a position sensing detector and light source with the mirrored surface at a proximal and distal Y-axis position.

Referring now to FIG. 15, which is a plan view, the yaw sensor generally is shown at 312. In an embodiment where the yaw sensor 312 is utilized in an electron beam lithography tool where the stage is operated in a vacuum enclosure, the yaw sensor 312 can be located outside of the vacuum enclosure, and the light beam 318 can be directed through a glass window 322 in the vacuum chamber wall 324. Passing the beams through a glass window does not degrade the sensing resolution. Locating the yaw sensor 312 outside the vacuum chamber, however, allows more effective heat removal, easier servicing and alignment, and a longer path for the beams 318. Longer beam path accomplishes better resolution. In FIG. 15, yaw sensor 312 comprises a light emitting source 320, such as a laser diode for producing a collimated laser beam, and a position sensing detector 328. The light emitting source 320, the position sensing detector 328, and a cylinder lens 326 together form the device which measures the yaw angle of the stage 11. A glass window 322 is disposed against the vacuum chamber wall 324 to allow passage of the collimated laser beams 318. The right angle mirror 51 with reflecting surfaces 52 and 53 is shown in a proximal position, "P," and a distal position, "D." In FIG. 15, for exemplary purposes, the P and D positions represent the furthest extent of Y axis travel of the stage 11 towards and away from the wall 324 of the vacuum chamber, respectively. FIG. 15 shows the stage at zero yaw angle, θ.

Figure 16:
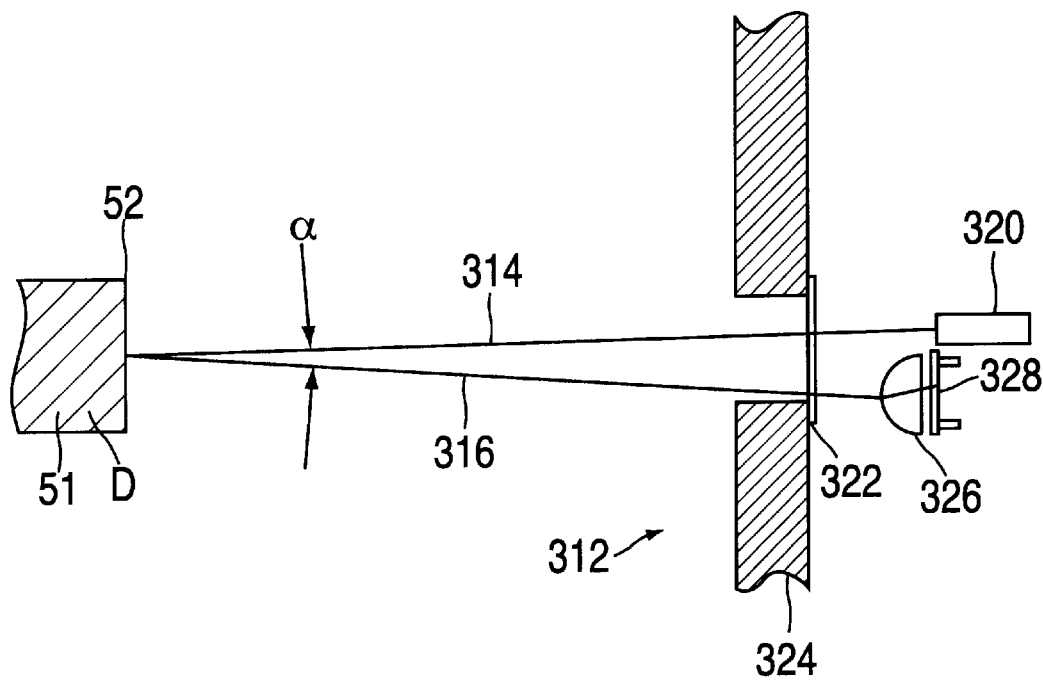
FIG. 16 is a partial cross section of the yaw sensor comprising a position sensing detector and light source of FIG. 15 with the mirrored surface at the distal Y-axis position along the line A—A of FIG. 15.
Figure 17:
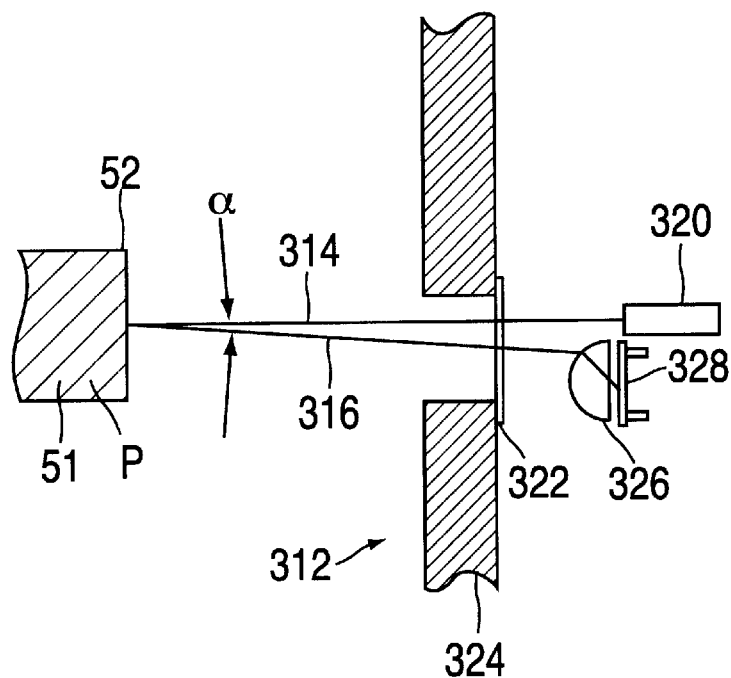
FIG. 17 is a partial cross section of the yaw sensor comprising a position sensing detector and light source of FIG. 15 with the mirrored surface at the proximal Y-axis position along the line A—A of FIG. 15.

FIGS. 16 and 17 are cross sections through line A—A of FIG. 15 with the stage 11 in the distal, "D" position, and proximal "P" position, respectively. As shown in FIG. 16, the light emitting source 320 sends an incident light beam 314 toward reflecting surface 52 at a slightly downward angel. The incident light beam 314 reflects off of the reflecting surface 52, and the reflected beam 316 is sent back toward the wall 324 of the vacuum chamber at an angle a with the incident beam. The reflected beam 316 passes through the glass window 322 and strikes the cylinder lens 326. The cylinder lens 326 focuses the reflected beam 316 on the position sensing detector 328 directly under the incident beam 314 because the yaw angle is zero. The cylinder lens 326 has a radius that allows the proper focusing of the reflected beam 316 on the position sensing detector 328 regardless of the Y position of the stage 11. As shown in FIG. 17, α remains the same if the stage 11 is moved to the P position, but the reflected beam 316 contacts the cylinder lens 326 at a different point on the surface of the cylinder lens 326. The cylinder lens 326 compensates for the different vertical position of the reflected beam 316, and focuses the reflected beam 316 on the position sensing detector as in FIG. 16.

Figure 18:
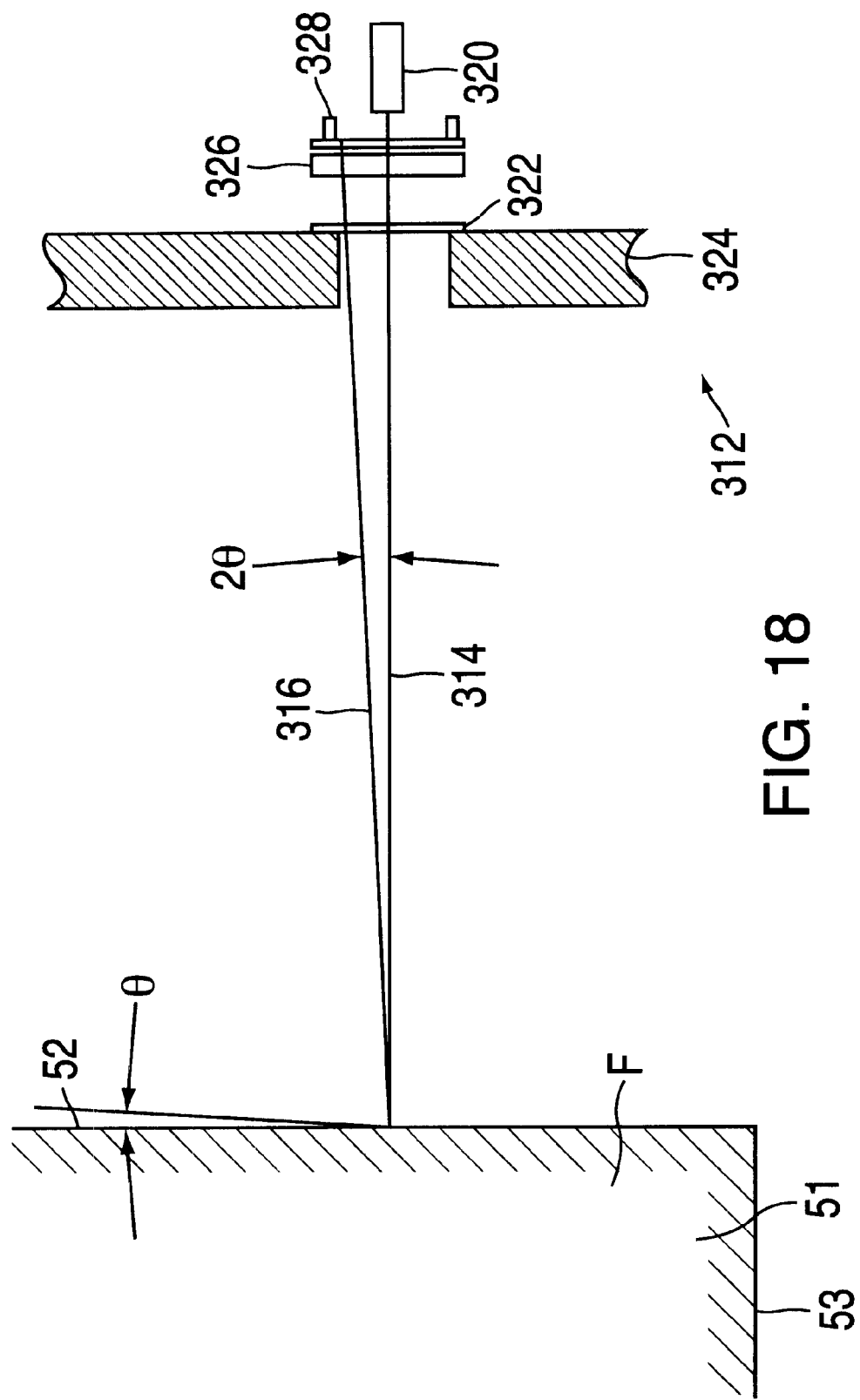
FIG. 18 is a plan view of the yaw sensor comprising a position sensing detector and light source with the mirrored surface at a yaw angle of θ.

In FIG. 18 shows a plan view of the yaw measuring system with the stage at yaw angle θ. In this case, the reflected beam 316 will not only be at a vertical angle a with the incident beam 314, but also a horizontal, or yaw, angle of 2θ. The reflected beam 316 will pass through the cylinder lens 326 as before, but in this case, the reflected beam 316 will strike the position sensing detector 328 at a position lateral to that shown in FIGS. 15–17. The position sensing detector 328 emits an analog signal that is proportional to the lateral position of the reflected beam 316. The signal is used by the servo control electronics 86 to take corrective actions to eliminate the measured yaw angle θ.

This X-Y positioning system is suitable for use by manufacturers and users of E-beam systems or similar kinds of systems in the semiconductor manufacturing industry. This X-Y table positioning system is designed for use with an E-Beam system employed for exposure of lithographic masks for use for semiconductor manufacturing. These drive tables provide improved manufacturing tolerances well below those possible or required in the past. The yaw measuring method of the present invention provides an economical and simple solution to determining yaw position of a stage positioning system. Also, the position sensing detector offers detection of yaw over a wider range than conventional yaw detectors, which allows easier calibration. Further, since the reflected beam is returned at an angle that is twice that of the stage yaw, the position sensing detector allows yaw position accuracy to within about 1 ppm, and the position sensing detector is insensitive to light beam shape and intensity. Finally, since the position sensing detector output is analog and proportional to the yaw of the stage, the signal can be fed directly to the yaw servo, without the need for digital to analog conversion.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A positioning stage comprising:
   a) a base having rectilinearly disposed x and y axes;
   b) a stage plate slideably supported on said base;
   c) at least three linear drive means rotatably engaging both said stage plate and rotatably engaging said base for moving said stage plate on a path with at least three separate drive displacements along said rectilinearly disposed x and y axes and rotation of said plate on said base substantially parallel to the surface of said base, said plate moving upon the surface of said base, whereby combined x, y rectilinear and rotary motions with respect to said base can be achieved;
   d) an x interferometer and receiver for determining x position;
   e) a y interferometer and receiver for determining y position; and,
   f) a device for determining yaw angle comprising a light emitting source, a cylinder lens, and a position sensing detector.

2. The stage of claim 1 wherein said light emitting source is a laser that produces a collimated laser beam.

3. A method for determining yaw angle of a positioning stage comprising:
   directing an incident beam of light from a light emitting source at a reflective surface on said positioning stage to create a reflected beam of light; passing said reflected beam of light through a cylinder lens to vertically focus said reflected beam of light on a position sensing detector; and
   generating a signal from said position sensing detector, wherein said signal is dependent upon the lateral position of said reflected beam on said position sensing detector.

4. The method of claim 3, wherein said signal is an analog signal.

5. The method of claim 4, wherein said analog signal is proportional to the lateral position of said reflected light beam on said position sensing detector.

6. The method of claim 3, wherein said position sensing detector, said cylinder lens, and said light emitting source are disposed in a vacuum chamber.

7. The method of claim 3, wherein said light emitting source is a laser that produces a collimated laser beam.

8. The method of claim 3, wherein said positioning stage comprises:

a) a base having rectilinearly disposed x and y axes;

b) a stage plate slideably supported on said base; and, c) at least three linear drive means rotatably engaging both said stage plate and rotatably engaging said base for moving said stage plate on a path with at least three separate drive displacements along said rectilinearly disposed x and y axes and rotation of said plate on said base substantially parallel to the surface of said base, said plate moving upon the surface of said base, whereby combined x, y rectilinear and rotary motions with respect to said base can be achieved.

9. A method of positioning a stage along two axes with three degrees of freedom, comprising:

determining the x-position of said stage by using an x interferometer;

determining the y-position of said stage by using a y interferometer;

determining the yaw angle of said stage by using a device comprising a light emitting source, a cylindrical lens, and a position sensing detector; and, positioning the stage by using the x-position determination, the y-position determination, and the yaw angle determination to close mechanical servo loops and correct yaw errors.

10. The method of claim 9 wherein said light emitting source used in determining the yaw angle is a laser that produces a collimated laser beam.

* * * * *